(12) United States Patent
Gurmen et al.

(10) Patent No.: US 9,034,806 B2
(45) Date of Patent: May 19, 2015

(54) VISCOELASTIC SURFACTANT RHEOLOGY MODIFICATION

(75) Inventors: M. Nihat Gurmen, Houston, TX (US); Christopher N. Fredd, Leesburg, FL (US)

(73) Assignee: Schlumberger Technology Corporation, Sugar Land, TX (US)

( * ) Notice: Subject to any disclaimer, the term of this patent is extended or adjusted under 35 U.S.C. 154(b) by 947 days.

(21) Appl. No.: 11/563,764

(22) Filed: Nov. 28, 2006

(65) Prior Publication Data

US 2007/0129262 A1 Jun. 7, 2007

Related U.S. Application Data

(60) Provisional application No. 60/742,833, filed on Dec. 5, 2005.

(51) Int. Cl.
C09K 8/584 (2006.01)
C09K 8/80 (2006.01)
C09K 8/68 (2006.01)

(52) U.S. Cl.
CPC . *C09K 8/68* (2013.01); *C09K 8/584* (2013.01); C09K 2208/30 (2013.01)

(58) Field of Classification Search
USPC .................................. 507/240, 261, 262, 267
See application file for complete search history.

(56) References Cited

U.S. PATENT DOCUMENTS

| | | | |
|---|---|---|---|
| 4,848,467 A | 7/1989 | Cantu et al. | |
| 4,957,165 A | 9/1990 | Cantu et al. | |
| 4,986,355 A | 1/1991 | Casad et al. | |
| 5,120,708 A | 6/1992 | Melear | |
| 5,782,300 A * | 7/1998 | James et al. | 166/278 |
| 5,979,557 A | 11/1999 | Card | |
| 6,258,859 B1 | 7/2001 | Dahayanake | |
| 6,435,277 B1 | 8/2002 | Qu | |
| 6,446,727 B1 | 9/2002 | Zemlak et al. | |
| 6,703,352 B2 | 3/2004 | Dahayanake | |
| 6,776,235 B1 * | 8/2004 | England | 166/271 |
| 6,881,709 B2 * | 4/2005 | Nelson et al. | 507/203 |
| 6,908,888 B2 | 6/2005 | Lee | |
| 7,219,731 B2 * | 5/2007 | Sullivan et al. | 166/278 |
| 7,237,608 B2 * | 7/2007 | Fu et al. | 166/279 |
| 7,275,596 B2 * | 10/2007 | Willberg et al. | 166/280.1 |
| 2002/0147114 A1 | 10/2002 | Dobson, Sr. et al. | |
| 2002/0167114 A1 | 11/2002 | Berry | |
| 2002/0193257 A1 * | 12/2002 | Lee et al. | 507/200 |
| 2003/0002195 A1 | 1/2003 | Sassolini et al. | |
| 2003/0136751 A1 | 7/2003 | Rosenberg | |
| 2003/0234103 A1 * | 12/2003 | Lee et al. | 166/293 |
| 2004/0094300 A1 * | 5/2004 | Sullivan et al. | 166/308.1 |
| 2004/0106525 A1 * | 6/2004 | Willberg et al. | 507/200 |
| 2004/0152601 A1 * | 8/2004 | Still et al. | 507/100 |
| 2005/0067165 A1 | 3/2005 | Cawiezel et al. | |
| 2005/0137095 A1 | 6/2005 | Cawiezel | |
| 2005/0155762 A1 | 7/2005 | Chen | |
| 2005/0252659 A1 * | 11/2005 | Sullivan et al. | 166/280.1 |
| 2006/0058197 A1 * | 3/2006 | Brown et al. | 507/103 |
| 2006/0111248 A1 | 5/2006 | Lee | |
| 2006/0128597 A1 | 6/2006 | Chen | |
| 2006/0128598 A1 | 6/2006 | Chen | |
| 2006/0283591 A1 * | 12/2006 | Willberg et al. | 166/280.1 |

FOREIGN PATENT DOCUMENTS

| | | |
|---|---|---|
| WO | 9856497 A1 | 12/1998 |
| WO | WO 9856497 A1 * | 12/1998 |
| WO | 9932572 A1 | 7/1999 |

OTHER PUBLICATIONS

Kirk, et al., "Nuts", Encyclopedia of Chemical Technology, 3rd Edition, vol. 16, John Wiley & Sons, 1981, pp. 248-273.
International Search Report issued in PCT/IB2006/054560 on May 25, 2007, 3 pages.

* cited by examiner

*Primary Examiner* — John J Figueroa
(74) *Attorney, Agent, or Firm* — Jeremy D. Tillman; Rachel E. Greene; Tim Curington

(57) ABSTRACT

Methods for treating a subterranean formation penetrated by a wellbore where shear recovery time of viscoelastic surfactant treatment fluids is shorten by adding an effective amount of an fiber based rheology enhancer. The rheology enhancer also increases fluid viscosity. Further, the rheology enhancer also improves proppant settling. Some examples of surfactants are betaines and quaternary amines, and an example of fiber based rheology enhancer is polylactic acid fiber. The fluids are useful in oilfield treatments, as well as methods of preparing viscoelastic surfactant based fluids.

19 Claims, No Drawings

US 9,034,806 B2

VISCOELASTIC SURFACTANT RHEOLOGY MODIFICATION

RELATED APPLICATION DATA

This patent application is a non-provisional application based upon provisional application Ser. No. 60/742833, filed Dec. 5, 2005, and claims the benefit of the filing date thereof.

BACKGROUND OF THE INVENTION

The statements in this section merely provide background information related to the present disclosure and may not constitute prior art.

The invention relates to rheology enhancers for viscoelastic surfactant fluid systems (VES's). More particularly it relates to selection and optimization of rheology enhancers for fluid systems to be used over broad ranges of salinity and temperature. Most particularly it relates to rheology enhancers to shorten shear recovery times and increase the viscosity of VES's for use in oilfield treatment fluids.

Certain surfactants, when in aqueous solution, form viscoelastic fluids. Such surfactants are termed "viscoelastic surfactants", or "VES's". Other components, such as additional VES's, co-surfactants, buffers, acids, solvents, and salts, are optional or necessary (depending upon the specific VES fluid system used) and perform such functions as increasing the stability (especially thermal stability) or increasing the viscosity of the systems by modifying and/or stabilizing the micelles; all the components together are called a viscoelastic surfactant system. Not to be limited by theory, but many viscoelastic surfactant systems form long rod-like or worm-like micelles in aqueous solution or vesicles. Entanglement of these micelle or vesicle structures gives viscosity and elasticity to the fluid. For a fluid to have good viscosity and elasticity under given conditions, proper micelles must be formed and proper entanglement is needed. This requires the surfactant's structure to satisfy certain geometric requirements and the micelles to have sufficient length or interconnections for adequate entanglements.

Many chemical additives are known to improve the rheological behavior (greater viscosity and/or greater stability and/or greater brine tolerance and/or lower shear sensitivity and/or faster rehealing if micelles are disrupted, for example by shear). Such materials are typically called co-surfactants, rheology modifiers, or rheology enhancers, etc., and typically are alcohols, organic acids such as carboxylic acids, sulfonic acids, and sulfonates. Such materials often have different effects, depending upon their exact composition and concentration, relative to the exact surfactant composition (for example hydrocarbon chain lengths of groups in the surfactant and co-surfactant) and concentration. For example, such materials may be beneficial at some concentrations and harmful (lower viscosity, reduced stability, greater shear sensitivity, longer rehealing times) at others.

In particular, many VES fluid systems exhibit long viscosity recovery times after experiencing prolonged high shear. Slow recovery may affect drag reduction and proppant transport capability. Although additives are known that can shorten VES shear recovery times and increase viscosities, there is a need for further rheology enhancers.

SUMMARY OF THE INVENTION

The invention relates to the use of rheology enhancers which improve the shear recovery of viscoelastic surfactant fluid systems (VES's). In one embodiment of the invention, a subterranean formation treatment method includes preparing and injecting into a wellbore a fluid containing a viscoelastic surfactant and a rheology enhancer in a concentration sufficient to decrease the shear recovery time of the fluid. The rheology may be a fiber or a particulate, either organic (i.e. polymeric), or inorganic based.

In another embodiment of the invention, the method includes preparing and injecting into a wellbore, a fluid containing a viscoelastic surfactant and a rheology enhancer to decrease shear recovery time, where the method is a fracturing treatment including a first fluid injection stage, and a second fluid injection stage. The fluid containing viscoelastic surfactant and rheology enhancer is injected during the first stage, and proppant is added to the fluid during the second fluid stage.

In yet another embodiment, a method for fracturing subterranean formation, the method includes providing a first fluid comprising a viscoelastic surfactant and rheology enhancer, the rheology enhancer added in a concentration sufficient to provide a shear recovery time of 60 seconds or less. The first fluid is then injected into a wellbore at a pressure equal to or greater than fracture initiation pressure of the formation. Subsequently, a second fluid containing a viscoelastic surfactant and a proppant is injected into the wellbore at a pressure equal to or greater than fracture initiation pressure of the formation. Optionally, while the first fluid is injected during a first fluid injection stage, the second fluid is injected during a second fluid injection stage, a third fluid comprising a second rheology enhancer may be injected during the second fluid stage. In some instances, during the second fluid stage, while the injection rate of the third fluid is decreased, the injection rate of the second fluid is increased.

Also, the invention relates to methods of decreasing the shear recovery time of viscoelastic surfactant based fluids, which includes providing a fluid comprising a viscoelastic surfactant and adding a rheology enhancer in a concentration sufficient to provide a shear recovery time of 60 seconds or less Methods of the invention are based upon viscoelastic surfactant fluid systems, where the viscoelastic surfactant may be a cationic, amphoteric, anionic or zwitterionic viscoelastic surfactant. Incorporated with the viscoelastic surfactant is a rheology enhancer which serves to decrease the shear recovery time of the VES fluid and may also increases fluid viscosity. The rheology enhancers extend the conditions under which the VES systems can be used, and reduce the amount of surfactant needed, which in turn reduces resources and improves clean-up.

The rheology enhancers may be particulates or fibers. In some embodiments, the rheology enhancers are polymers, either fibrous or particulate, which may be linear, branched, or crosslinked polymers, which may have a molecular structural shape such as comb, dendritic, brush, graft, star or star-branched, or may be oligomeric. Some materials used as rheology enhancers are solid cyclic dimers, or solid polymers, of certain organic acids, that hydrolyze under known and controllable conditions of temperature, time and pH; where the degradation products are organic acids. One example is the solid cyclic dimer of lactic acid. Others include polymers of lactic acid, glycolic acid, and copolymers of lactic acid and glycolic acid. Yet another example is the solid cyclic dimer of glycolic acid.

Other materials such as barite, fly ash, fumed silica, other crystalline or amorphous silicas, sintered bauxite, talc, mica, ceramic materials, glass beads, carbonates, taconite, benzoic acid, salts, rock salt, starch, magnesium oxide, walnut shells, coconut, pecan, almond, ivory nut, brazil nut, etc.; ground or crushed seed shells of seeds of fruits such as plum, olive, peach, cherry, apricot, etc.; ground or crushed seed shells of other plants such as maize; processed wood materials such as those derived from woods such as oak, hickory, walnut, poplar, mahogany, etc., shells, aluminum pellets, and the like, may be used as rheology enhancers, whether in fiber or particulate form.

In addition to oilfield uses, the rheology enhancer of the invention may be used in household and industrial cleaners, agricultural chemicals, personal hygiene products, cosmetics, pharmaceuticals, printing and other fields.

Also, some embodiments of the invention are shear-recovering fluids including a viscoelastic surfactant and rheology enhancer, wherein the shear recovery time of the fluid is 60 seconds or less, and wherein the rheology enhancer is a fiber material, a particulate material or combination of both.

DETAILED DESCRIPTION OF SOME EMBODIMENTS OF THE INVENTION

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure.

The description and examples are presented solely for the purpose of illustrating the some embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components other than the ones already cited. In the summary of the invention and this detailed description, each numerical value should be read once as modified by the term "about" (unless expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range.

When fluids are viscosified by the addition of viscoelastic surfactant systems, the viscosity increase is believed to be due to the formation of micelles, for example worm-like micelles or vesicles, which entangle to give structure to the fluid that leads to the viscosity. In addition to the viscosity itself, an important aspect of a fluid's properties is the degree and rate of viscosity-recovery or re-healing when the fluid is subjected to high shear and the shear is then reduced. For VES fluids, shear may disrupt the micelle structure, after which the structure reforms. Controlling the degree and rate of reassembling (re-healing) is necessary to maximize performance of the surfactant system for different applications. For example, in hydraulic fracturing it is important for the fluid to regain viscosity as quickly as possible after exiting the high-shear region in the tubulars and entering the low-shear environment in the hydraulic fracture. On the other hand, it is beneficial in coiled tubing cleanouts to impart a slight delay in regaining full viscosity in order to "jet" the solids more efficiently from the bottom of the wellbore into the annulus. Once in the annulus the regained viscosity ensures that the solids are effectively transported to the surface.

Viscoelastic surfactant fluid systems have been shown to have excellent rheological properties for hydraulic fracturing applications; however, shear recovery time, not fluid viscosity, often dictates the minimum concentration of surfactant required. For example, a fluid made with a certain concentration of surfactant may show adequate viscosity for fracturing at a given temperature, but the minimal usable concentration may be high due to slow shear recovery with a lower concentration. An example of an acceptable shear recovery time is about 60 seconds or less, preferably about 40 seconds or less, more preferably about 20 seconds or less, and even more preferably about 15 seconds or less. A time longer than about 60 seconds may negatively impact drag reduction and proppant transport.

By "shear recovery time", it is meant the time determined using a common technique for determining shear recovery time wherein the fluid is poured back and forth between a beaker and the blender cup and the fluid recovery is characterized by two times visual observation, referred to as the initial and final recovery times. The initial fluid recovery time is the time at which fluid "balling" occurred (when the fluid shows the first signs of elasticity as indicated by the fluid taking a longer time to achieve a flat surface in the receiving beaker when poured). The final fluid recovery time is the time at which fluid "lipping" occurred. The fluid "lips" when inclining the upper beaker or cup containing the fluid does not result in fluid flow into the container below, but rather the formation of a "lip", and pulling the container back to a vertical position pulls back the "lip". For purposes herein, "lipping" is used to estimate when the fluid reaches its near-equilibrium elasticity, and thus the shear recovery time.

Shortening the viscosity-recovery time makes it possible to use VES fluid systems that would otherwise not be suitable in many applications. In addition, when a rheology modifier also increases fluid viscosity, then less surfactant is needed to provide a given viscosity. Examples of rheology enhancers are given in U.S. patent application Ser. No. 10/994,664, which is assigned to the same assignee as the present invention and which is hereby incorporated in its entirety.

Inventors have discovered certain additives, when included in certain viscoelastic surfactant fluid systems (such as cationic, amphoteric, anionic and zwitterionic viscoelastic surfactant fluid systems), in the proper concentration relative to the surfactant active ingredient, significantly shorten the shear recovery time of VES systems, while maintaining or even increasing the fluid viscosity. In some cases, the shear recovery may be nearly instantaneous. The additives, termed "rheology enhancers", are effective for shortening the viscosity recovery, or "rehealing", time after high shear, and increasing the viscosity of VES systems at a given temperature, making the fluids more useful for many purposes, such as, but not limited to, uses as oilfield treatment fluids, especially stimulation fluids, most particularly hydraulic fracturing fluids. The rheology enhancers extend the conditions under which the VES systems can be used, and reduce the amount of surfactant needed, which in turn reduces resources and improves clean-up.

The rheology enhancers may be particulates or fibers. In some embodiments, the rheology enhancers are polymers, either fibrous or particulate, which, from a molecular structure perspective, may be linear, branched, crosslinked, and could have a structural shape such as comb, dendritic, brush, graft, star or star-branched, or may be oligomeric. The polymers may contain repeating units other than vinyl esters, vinyl acrylates, and the corresponding hydrolysed groups. The possible other repeating units are, for example, polyethylene oxide/polyethylene glycol or polypropylene oxide/polypropylene glycol. The copolymers may be random, alternating, or block copolymers. These rheology enhancers may be soluble or insoluble in the oilfield treatment fluid. When soluble, the rate of solution of the rheology enhancers may depend on the temperature and concentrations of the other constituents of the oilfield treatment fluid, such as water content.

Rheology enhancers used according the invention are substantially particulates or fibers, which may be polymer based (as stated hereinabove), where the polymers are natural or synthetic polymers. Examples of some suitable polymer materials include, but are not limited to, substituted and unsubstituted lactide, glycolide, polylactic acid, polyglycolic acid, a copolymer of polylactic acid and polyglycolic acid, a copolymer of glycolic acid with other hydroxy-, carboxylic acid-, or hydroxycarboxylic acid-containing moieties, a copolymer of lactic acid with other hydroxy-, carboxylic acid or hydroxycarboxylic acid-containing moieties, or mixtures of the preceding. Some other materials suitable for use are all those polymers of hydroxyacetic acid (glycolic acid) with itself or other hydroxy-, carboxylic acid-, or hydroxycarboxylic acid-containing moieties described in U.S. Pat. Nos. 4,848,467; 4,957,165; and 4,986,355, all three hereby incorporated by reference. Suitable materials for the fibers of the invention are also described in U.S. Patent Application Publication Nos. 2003/002195 and 2004/0152601, both of which are hereby incorporated by reference and are assigned to the assignee of the present application. Other polymers, for example those that degrade at other temperatures, or other pH's, or those that have different chemical compatibilities, may be used, for example polyvinyl alcohol, optionally with suitable carrier fluid adjustment.

Some materials used as rheology enhancers of the invention are solid cyclic dimers, or solid polymers, of certain organic acids, that hydrolyze under known and controllable conditions of temperature, time and pH; where the degradation products are organic acids. One example is the solid cyclic dimer of lactic acid (known as "lactide"), which has a melting point of 95 to 125° C., (depending upon the optical activity). Another is a polymer of lactic acid, (sometimes called a polylactic acid (or "PLA"), or a polylactate, or a polylactide). Another example is the solid cyclic dimer of glycolic acid (known as "glycolide"), which has a melting point of about 86° C. Yet another example is a polymer of glycolic acid (hydroxyacetic acid), also known as polyglycolic acid ("PGA"), or polyglycolide. Another example is a copolymer of lactic acid and glycolic acid. These polymers and copolymers are polyesters. Generally the cyclic dimers are polymerized to form the final polymer from which the fiber is made, but for low temperature operations fiber may be made directly from the solid cyclic dimers. The as-received commercially available materials may contain some free acid, for example up to about 5%) and some solvent, typically water.

NatureWorks LLC, Minnetonka, Minn., USA, owned by Cargill Inc., Minneapolis, Minn., USA, produces a solid cyclic lactic acid dimer called "lactide" and from it produces lactic acid polymers, or polylactates, with varying molecular weights and degrees of crystallinity, under the generic trade name NatureWorks™ PLA. The PLA's currently available from NatureWorks most commonly have molecular weights of up to about 100,000, although any polylactide (made by any process by any manufacturer) and any molecular weight material of any degree of crystallinity may be used in the embodiments of the Invention. The PLA polymers are solids at room temperature and are hydrolyzed by water to form lactic acid. Those available from NatureWorks typically have crystalline melt temperatures of from about 120 to about 170° C., but others are obtainable. Poly(d,l-lactide) is available from Bio-Invigor, Beijing and Taiwan, with molecular weights of up to 500,000. Bio-Invigor also supplies polyglycolic acid (also known as polyglycolide) and various copolymers of lactic acid and glycolic acid, often called "polyglactin" or poly(lactide-co-glycolide). The rates of the hydrolysis reactions of all these materials are governed, among other factors, by the molecular weight, the crystallinity (the ratio of crystalline to amorphous material), the physical form (size and shape of the solid), and in the case of polylactide, the amounts of the two optical isomers. (The naturally occurring l-lactide forms partially crystalline polymers; synthetic dl-lactide forms amorphous polymers.) Amorphous regions are more susceptible to hydrolysis than crystalline regions. Lower molecular weight, less crystallinity and greater surface-to-mass ratio all result in faster hydrolysis. Hydrolysis is accelerated by increasing the temperature, by adding acid or base, or by adding a material that reacts with the hydrolysis product(s).

Homopolymers can be more crystalline; copolymers tend to be amorphous unless they are block copolymers. The extent of the crystallinity can be controlled by the manufacturing method for homopolymers and by the manufacturing method and the ratio and distribution of lactide and glycolide for the copolymers. Polyglycolide can be made in a porous form. Some of the fibers dissolve very slowly in water before they hydrolyze. In some embodiments, the rheology enhancers may self-destruct in situ, that is, in the location where they are placed or reside after or during treatment. Although normally that is in a proppant pack in a fracture, that location may also be part of a suspension in the wellbore, in perforations, in a gravel pack, as a component of a filter cake on the walls of a wellbore or of a fracture, or in natural fractures or vugs in a formation. The fiber/polymeric viscosifier system may be used in carbonate, sandstone, shale, and coal reservoirs, or combinations thereof. A particular advantage of these materials is that the fibers of the invention and the generated acids are non-toxic and are biodegradable.

Other materials such as barite, fly ash, fumed silica, other crystalline or amorphous silicas, sintered bauxite, talc, mica, ceramic materials, glass beads, carbonates, taconite, benzoic acid, salts, rock salt, starch, magnesium oxide, walnut shells, coconut, pecan, almond, ivory nut, brazil nut, etc.; ground or crushed seed shells (including fruit pits) of seeds of fruits such as plum, olive, peach, cherry, apricot, etc.; ground or crushed seed shells of other plants such as maize (e.g., corn cobs or corn kernels), etc.; processed wood materials such as those derived from woods such as oak, hickory, walnut, poplar, mahogany, etc., shells, aluminum pellets and the like may be used as rheology enhancers, whether in fiber or particulate form. The materials may be naturally occurring and underived and/or unprocessed naturally occurring materials, as well as materials based on naturally occurring materials that have been processed and/or derived. Essentially, any materials that will that will not cause the operation or treatment fluid to fail are acceptable for use as rheology enhancers. Preferably, the materials should substantially retain their size and shape during use.

The particulates or fibers of the invention may be coated by any suitable coating to slow hydrolysis. Nonlimiting examples of coating materials include polycaprolate (a copolymer of glycolide and epsilon-caprolactone), and calcium stearate, both of which are hydrophobic. Polycaprolate itself slowly hydrolyzes. Generating a hydrophobic layer on the surface of the materials for the fibers of the invention by any means delays the hydrolysis. Note that coating here may refer to encapsulation or simply to changing the surface by chemical reaction or by forming or adding a thin film of another material, for example an oil. The degradation does not occur until water contacts the materials the fibers.

Although any suitable shape and size may be incorporated into fluids used in methods of the invention, fibers used in some embodiments of the invention have a length of about 2-25 mm, preferably about 3-18 mm, most preferably about 6 mm; they have a denier of about 0.1-20, preferably about 0.15-6, most preferably about 1.4. The rheology enhancer may be used at any suitable levels in the fluid, while in some embodiments, the rheology enhancer is incorporated at a concentration of from about 0.0001% to about 5% by weight based upon total weight of fluid, preferably from about 0.0001% to about 1% by weight based upon total weight of fluid, and more preferably from about 0.0001% to about 0.25% by weight based upon total weight of fluid. In some embodiments the rheology enhancer is incorporated based upon surface area provided per volume of fluid, for example, and not necessarily limited to, from about 0.1 m² to about 10 m² per liter of fluid, preferably from about 0.2 m² to about 5 m² per liter of fluid, and more preferably from about 0.5 m² to about 5 m² per liter of fluid. In yet others, the rheology enhancer is incorporated in an amount which provides a surface area of about 0.1 m² per liter of fluid or greater, preferably from about 0.2 m² per liter of fluid or greater, and more preferably from about 0.5 m² per liter of fluid or greater.

The rheology enhancers of the present invention give the desired results with cationic, amphoteric, anionic, and zwitterionic viscoelastic surfactant systems. Preferred fluid systems are based upon zwitterionic surfactants. In general, particularly suitable zwitterionic surfactants have the formula:

RCONH—(CH$_2$)$_a$(CH$_2$CH$_2$O)$_m$(CH$_2$)$_b$—N$^+$(CH$_3$)$_2$—(CH$_2$)$_{a'}$(CH$_2$CH$_2$O)$_{m'}$(CH$_2$)$_{b'}$COO$^-$ in which R is an alkyl group that contains from about 17 to about 23 carbon atoms which may be branched or straight chained and which may be saturated or unsaturated; a, b, a', and b' are each from 0 to 10 and m and m' are each from 0 to 13; a and b are each 1 or 2 if m is not 0 and (a+b) is from 2 to 10 if m is 0; a' and b' are each 1 or 2 when m' is not 0 and (a'+b') is from 1 to 5 if m is 0; (m+m') is from 0 to 14; and CH$_2$CH$_2$O may also be OCH$_2$CH$_2$.

Preferred zwitterionic surfactants include betaines. Two suitable examples of betaines are BET-O and BET-E. The surfactant in BET-O-30 is shown below; one chemical name is oleylamidopropyl betaine. It is designated BET-O-30 because as obtained from the supplier (Rhodia, Inc. Cranbury, N.J., U.S.A.) it is called Mirataine BET-O-30 because it contains an oleyl acid amide group (including a C$_{17}$H$_{33}$ alkene tail group as shown below) and contains about 30% active surfactant; the remainder is substantially water, sodium chloride, and propylene glycol. An analogous material, BET-E-40, is also available from Rhodia and contains an erucic acid amide group (including a C$_{21}$H$_{41}$ alkene tail group as shown below) and is approximately 40% active ingredient, with the remainder being substantially water, sodium chloride, and isopropanol. VES systems, in particular BET-E-40, optionally contain about 1% of a condensation product of a naphthalene sulfonic acid, for example sodium polynaphthalene sulfonate, as a rheology modifier, as described in U.S. Patent Application Publication No. 2003-0134751. The surfactant in BET-E-40 is also shown below; one chemical name is erucylamidopropyl betaine. As-received concentrates of BET-E-40 were used in the experiments reported below, where they will be referred to as "VES" and "VES-1". BET surfactants, and other VES's that are suitable for the present Invention, are described in U.S. Pat. No. 6,258,859. According to that patent, BET surfactants make viscoelastic gels when in the presence of certain organic acids, organic acid salts, or inorganic salts; in that patent, the inorganic salts were present at a weight concentration up to about 30%. Co-surfactants may be useful in extending the brine tolerance, and to increase the gel strength and to reduce the shear sensitivity of the VES-fluid, in particular for BET-O-type surfactants. An example given in U.S. Pat. No. 6,258,859 is sodium dodecylbenzene sulfonate (SDBS), also shown below. Other suitable co-surfactants include, for example those having the SDBS-like structure in which x=5-15; preferred co-surfactants are those in which x=7-15. Still other suitable co-surfactants for BET-O-30 are certain chelating agents such as trisodium hydroxyethylethylenediamine triacetate. The rheology enhancers of the present invention may be used with viscoelastic surfactant fluid systems that contain such additives as co-surfactants, organic acids, organic acid salts, and/or inorganic salts.

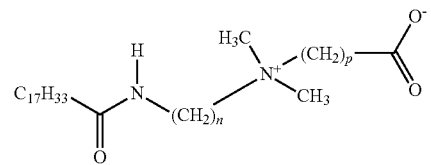

Surfactant in BET-O-30 (when n=3 and p=1)

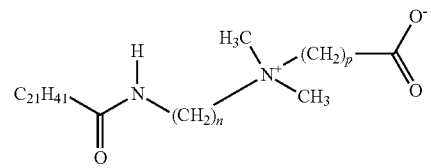

Surfactant in BET-E-40 (when n=3 and p=1)

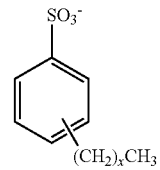

SDBS (when x=11 and the counterion is Na$^+$)

Some embodiments of the present invention use betaines; most preferred embodiments use BET-E-40. Although experiments have not been performed, it is believed that mixtures of betaines, especially BET-E-40, with other surfactants are also suitable. Such mixtures are within the scope of embodiments of the invention.

Other betaines that are suitable include those in which the alkene side chain (tail group) contains 17-23 carbon atoms (not counting the carbonyl carbon atom) which may be branched or straight chained and which may be saturated or unsaturated, n=2-10, and p=1-5, and mixtures of these compounds. More preferred betaines are those in which the alkene side chain contains 17-21 carbon atoms (not counting the carbonyl carbon atom) which may be branched or straight chained and which may be saturated or unsaturated, n=3-5, and p=1-3, and mixtures of these compounds. These surfactants are used at a concentration of about 0.5 to about 10%, preferably from about 1 to about 5%, and most preferably from about 1.5 to about 4.5%.

Exemplary cationic viscoelastic surfactants include the amine salts and quaternary amine salts disclosed in U.S. Pat. Nos. 5,979,557, and 6,435,277 which have a common Assignee as the present application and which are hereby incorporated by reference. Examples of suitable cationic viscoelastic surfactants include cationic surfactants having the structure:

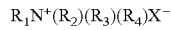

$R_1N^+(R_2)(R_3)(R_4)X^-$ in which $R_1$ has from about 14 to about 26 carbon atoms and may be branched or straight chained, aromatic, saturated or unsaturated, and may contain a carbonyl, an amide, a retroamide, an imide, a urea, or an amine; $R_2$, $R_3$, and $R_4$ are each independently hydrogen or a $C_1$ to about $C_6$ aliphatic group which may be the same or different, branched or straight chained, saturated or unsaturated and one or more than one of which may be substituted with a group that renders the $R_2$, $R_3$, and $R_4$ group more hydrophilic; the $R_2$, $R_3$ and $R_4$ groups may be incorporated into a heterocyclic 5- or 6-member ring structure which includes the nitrogen atom; the $R_2$, $R_3$ and $R_4$ groups may be the same or different; $R_1$, $R_2$, $R_3$ and/or $R_4$ may contain one or more ethylene oxide and/or propylene oxide units; and $X^-$ is an anion. Mixtures of such compounds are also suitable. As a further example, $R_1$ is from about 18 to about 22 carbon atoms and may contain a carbonyl, an amide, or an amine, and $R_2$, $R_3$, and $R_4$ are the same as one another and contain from 1 to about 3 carbon atoms.

Cationic surfactants having the structure $R_1N^+(R_2)(R_3)(R_4)$ $X^-$ may optionally contain amines having the structure $R_1N(R_2)(R_3)$. It is well known that commercially available cationic quaternary amine surfactants often contain the corresponding amines (in which $R_1$, $R_2$, and $R_3$ in the cationic surfactant and in the amine have the same structure). As received commercially available VES surfactant concentrate formulations, for example cationic VES surfactant formulations, may also optionally contain one or more members of the group consisting of alcohols, glycols, organic salts, chelating agents, solvents, mutual solvents, organic acids, organic acid salts, inorganic salts, oligomers, polymers, co-polymers, and mixtures of these members. They may also contain performance enhancers, such as viscosity enhancers, for example polysulfonates, for example polysulfonic acids, as described in copending U.S. Patent Application Publication No. 2003-0134751 which has a common Assignee as the present application and which is hereby incorporated by reference.

Another suitable cationic VES is erucyl bis(2-hydroxyethyl)methyl ammonium chloride, also known as (Z)-13 docosenyl-N—N-bis(2-hydroxyethyl) methyl ammonium chloride. It is commonly obtained from manufacturers as a mixture containing about 60 weight percent surfactant in a mixture of isopropanol, ethylene glycol, and water. Other suitable amine salts and quaternary amine salts include (either alone or in combination in accordance with the invention), erucyl trimethyl ammonium chloride; N-methyl-N,N-bis(2-hydroxyethyl) rapeseed ammonium chloride; oleyl methyl bis(hydroxyethyl) ammonium chloride; erucylamidopropyltrimethylamine chloride, octadecyl methyl bis(hydroxyethyl) ammonium bromide; octadecyl tris(hydroxyethyl) ammonium bromide; octadecyl dimethyl hydroxyethyl ammonium bromide; cetyl dimethyl hydroxyethyl ammonium bromide; cetyl methyl bis(hydroxyethyl)ammonium salicylate; cetyl methyl bis(hydroxyethyl)ammonium 3,4,-dichlorobenzoate; cetyl tris(hydroxyethyl) ammonium iodide; cosyl dimethyl hydroxyethyl ammonium bromide; cosyl methyl bis(hydroxyethyl) ammonium chloride; cosyl tris(hydroxyethyl) ammonium bromide; dicosyl dimethyl hydroxyethyl ammonium bromide; dicosyl methyl bis(hydroxyethyl) ammonium chloride; dicosyl tris(hydroxyethyl) ammonium bromide; hexadecyl ethyl bis(hydroxyethyl) ammonium chloride; hexadecyl isopropyl bis(hydroxyethyl) ammonium iodide; and cetylamino, N-octadecyl pyridinium chloride.

Amphoteric viscoelastic surfactants are also suitable. Some exemplary viscoelastic surfactant systems include those described in U.S. Patent Application Nos. 2002/0147114, 2005/0067165, and 2005/0137095, for example amidoamine oxides. These three references are hereby incorporated in their entirety. Mixtures of zwitterionic surfactants and amphoteric surfactants are suitable. An example is a mixture of about 13% isopropanol, about 5% 1-butanol, about 15% ethylene glycol monobutyl ether, about 4% sodium chloride, about 30% water, about 30% cocoamidopropyl betaine, and about 2% cocoamidopropylamine oxide.

The viscoelastic surfactant system may also be based upon any suitable anionic surfactant. In some embodiments, the anionic surfactant is an alkyl sarcosinate. The alkyl sarcosinate can generally have any number of carbon atoms. Presently preferred alkyl sarcosinates have about 12 to about 24 carbon atoms. The alkyl sarcosinate can have about 14 to about 18 carbon atoms. Specific examples of the number of carbon atoms include 12, 14, 16, 18, 20, 22, and 24 carbon atoms. The anionic surfactant is represented by the chemical formula:

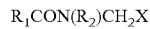

$R_1CON(R_2)CH_2X$ wherein $R_1$ is a hydrophobic chain having about 12 to about 24 carbon atoms, $R_2$ is hydrogen, methyl, ethyl, propyl, or butyl, and X is carboxyl or sulfonyl. The hydrophobic chain can be an alkyl group, an alkenyl group, an alkylarylalkyl group, or an alkoxyalkyl group. Specific examples of the hydrophobic chain include a tetradecyl group, a hexadecyl group, an octadecentyl group, an octadecyl group, and a docosenoic group.

Viscoelastic surfactant fluids, for example those used in the oilfield, may also contain agents that dissolve minerals and compounds, for example in formations, scale, and filtercakes. Such agents may be, for example, hydrochloric acid, formic acid, acetic acid, lactic acid, glycolic acid, sulfamic acid, malic acid, citric acid, tartaric acid, maleic acid, methylsulfamic acid, chloroacetic acid, aminopolycarboxylic acids, 3-hydroxypropionic acid, polyaminopolycarboxylic acids, for example trisodium hydroxyethylethylenediamine triacetate, and salts of these acids and mixtures of these acids and/or salts. For sandstone treatment, the fluid also typically contains a hydrogen fluoride source. The hydrogen fluoride source may be HF itself or may be selected from ammonium fluoride and/or ammonium bifluoride or mixtures of the two;

when strong acid is present the HF source may also be one or more of polyvinylammonium fluoride, polyvinylpyridinium fluoride, pyridinium fluoride, imidazolium fluoride, sodium tetrafluoroborate, ammonium tetrafluoroborate, and salts of hexafluoroantimony. When the formation-dissolving agent is a strong acid, the fluid preferably contains a corrosion inhibitor. The fluid optionally contains chelating agents for polyvalent cations, for example especially aluminum, calcium and iron (in which case the agents are often called iron sequestering agents) to prevent their precipitation. Some of the formation-dissolving agents just described are such chelating agents as well. Chelating agents are added at a concentration, for example, of about 0.5% (of active ingredient). When VES fluids contain strong acids, they are typically not gelled and display low viscosity; when the pH increases as the acid reacts with the mineral, the system gels and the viscosity increases. Such fluids may be called viscoelastic diverting acids. The rheology enhancers of the present invention may be used in viscoelastic surfactant fluid systems containing acids and chelating agents.

Preparation and use (mixing, storing, pumping, etc.) of the VES fluids containing rheology enhancers may be conducted by any suitable technique, and in some methods of the invention, may be substantially the same as for such conventional fluids without the rheology enhancers. For example, the order of mixing may not necessarily be affected by including rheology enhancers. Optionally, the rheology enhancers may be incorporated in surfactant concentrates so that the concentrates can be diluted with an aqueous fluid to make VES systems. This maintains the operational simplicity of the VES systems. As is normally the case in fluid formulation, laboratory tests should be run to ensure that the additives do not affect, and are not affected by, other components in the fluid (such as salts, for example). In particular, the rheology enhancers of the present invention may be used with other rheology modifiers. Adjusting the concentrations of surfactant, rheology enhancer, and other fluid components to account for the effects of other components is within the scope of the invention.

The optimal concentration of a given rheology enhancing additive in methods of the invention for a given choice of VES surfactant fluid system at a given concentration and temperature, and with given other materials present, can be determined by simple experiments. The total viscoelastic surfactant concentration must be sufficient to form a viscoelastic gel under conditions at which the surfactants have sufficient aggregation tendency. The appropriate amounts of surfactant and rheology enhancer are those necessary to achieve the desired viscosity and shear recovery time as determined by experiment. Again, tolerance for, and optimal amounts of other additives may also be determined by simple experiment. Commercially available surfactant concentrates may contain some materials that are themselves rheology enhancers, although they may be present for example for concentrate freezing point depression, so the amount of surfactant and rheology enhancer used is determined for the specific concentrate used. Mixtures of surfactants and/or mixtures of rheology enhancers (including mixtures of more than one rheology enhancer of the invention, and mixtures of one or more rheology enhancers of the invention with one or more other rheology enhancers) may be used. Mixtures of surfactants may include surfactants that are not viscoelastic surfactants when not part of a viscoelastic surfactant system. All mixtures are tested and optimized; for example, too much total rheology enhancer may decrease the beneficial effects.

Proppant particles may be used in some embodiments of the invention, while in some embodiments proppants may not be included. When incorporated, the proppant loading can be adjusted to deal with expected stresses in the fracture to prevent crushing of the proppant and embedment. Proppant candidate selection may be based on such factors as the rock strength, injection pressures, types of injection fluids, or even operation design, provided that it is compatible with the base and the bridging-promoting materials if the latter are used, the formation, the fluid, and the desired results of the treatment. Such proppants (gravels) can be natural or synthetic, coated, or contain chemicals; more than one can be used sequentially or in mixtures of different sizes or different materials. Proppants and gravels in the same or different wells or treatments can be the same material and/or the same size as one another and the term "proppant" is intended to include gravel in this discussion. Proppant is selected based on the rock strength, injection pressures, types of injection fluids, or even completion design. Preferably, the proppant materials include, but are not limited to, sand, sintered bauxite, glass beads, ceramic materials, naturally occurring materials, or similar materials. Mixtures of proppants can be used as well. Naturally occurring materials may be underived and/or unprocessed naturally occurring materials, as well as materials based on naturally occurring materials that have been processed and/or derived. Suitable examples of naturally occurring particulate materials for use as proppants include, but are not necessarily limited to: ground or crushed shells of nuts such as walnut, coconut, pecan, almond, ivory nut, brazil nut, etc.; ground or crushed seed shells (including fruit pits) of seeds of fruits such as plum, olive, peach, cherry, apricot, etc.; ground or crushed seed shells of other plants such as maize (e.g., corn cobs or corn kernels), etc.; processed wood materials such as those derived from woods such as oak, hickory, walnut, poplar, mahogany, etc., including such woods that have been processed by grinding, chipping, or other form of particalization, processing, etc. Further information on some of the above-noted compositions thereof may be found in Encyclopedia of Chemical Technology, Edited by Raymond E. Kirk and Donald F. Othmer, Third Edition, John Wiley & Sons, Volume 16, pages 248-273 (entitled "Nuts"), Copyright 1981, which is incorporated herein by reference.

In some embodiments of the invention, the proppant used may be resin coated (precured, partially cured and fully curable) or un-coated versions of: high strength proppants (density 3.4-3.6 sgu) in all sizes 40/70 to 8/12 mesh; intermediate strength proppants (density 3.1-3.3 sgu) in all sizes 40/70 to 8/12 mesh; even light weight proppants (density 2.6-0.2.8 sgu) in all sizes 40/70 to 8/12 mesh; or natural sands (density 2.55-0.2.75 sgu) in all sizes 40/70 to 8/12 mesh.

The concentration of proppant may be any suitable concentration, and may be, for example, from about 0.1 lbs to about 20 lbs added per gallon of fluid carrying the proppant. Also, as described above, any of the proppant particles can further be coated with a resin to potentially improve the strength, clustering ability, and flow back properties of the proppant.

In some embodiments of the invention, a fracture is initiated by first pumping a high viscosity VES-based aqueous fluid, optionally containing rheology enhancer and typically no proppant, into the formation. When the rheology enhancer is incorporated into this first fluid, it may also serve as a sweep the wellbore and formation prior to proppant placement. This initial fluid, typically referred to as a "pad", is usually followed by a second fluid (fracturing fluid or proppant laden fluid) of similar viscosity carrying an initially low concentration, or no concentration of proppant, and then a gradually increasing concentration of proppant into the extended fractures. The pad initiates and propagates the fracture but does not need to carry proppant. All the fluids tend to "leak-off" into the formation from the fracture being created. Commonly, by the end of the job the entire volume of the pad will have leaked off into the formation. This leak-off is determined and controlled by the properties of the fluid (and additives it may contain) and the properties of the rock. A certain amount of leak-off greater than the minimal possible may be desirable, for example a) if the intention is to place some fluid in the rock to change the rock properties or to flow back into the fracture during closure, or b) if the intention is deliberately to cause what is called a "tip screen-out", or "TSO", a condition in which the proppant forms a bridge at the end of the fracture, stopping the lengthening of the fracture and resulting in a subsequent increase in the fracture width. On the other hand, excessive leak-off is undesirable because it may waste valuable fluid and result in reduced efficiency of the job. Proper leak-off control is therefore critical to job success. Many solid particulate additives, such as silica, mica and starch, have been developed to control leak-off.

In some embodiments of the invention, where proppant is included in the treatment, a substantial volume of injected fracturing fluid can contain proppant, so that when the pressure is released the proppant is trapped between the fracture faces and prevents the fracture from completely closing, thus leaving a flowpath open. The injected fracturing fluid is viscosified. Increased viscosity results in formation of a wider fracture, thus a larger flowpath. A minimal viscosity is also required to transport adequate amounts of proppant; the actual viscosity required depends primarily upon the fluid flow rate and the density of the proppant.

Proppant may be the same material as the rheology enhancer, while in some other embodiments, the proppant and rheology enhancer are different materials. Proppant may also serve as the rheology enhancer in some cases. In other embodiments, where the proppant and rheology enhancer are different materials and are incorporated into the treatment fluid during the proppant laden stage of the treatment operation, over the duration of the stage, the proppant and rheology enhancer may be mixed to together in suitable ratios, added separately during the stage, or ramped up/ramped down during the stage. For example, when the proppant and rheology enhancer are ramped up/ramped down, at the beginning of the stage, the rheology enhancer is added (i.e. metered into the fluid) while little or no proppant is added, and as the stage progresses, the addition rate of rheology enhancer is tapered while the addition rate of proppant is increased. In yet other embodiments, the rheology enhancer may be mixed with the treatment fluid during at least a substantial portion, or even the whole portion, of treatment operations.

The fluids used in methods of the invention may be used, for example, in oilfield treatments methods, including fracturing, gravel packing, diversion, cleanout, and the like. The fluids may also be used in other industrial methods, such as preparation of household and industrial cleaners, agricultural chemicals, personal hygiene products, cosmetics, pharmaceuticals, printing and the like.

Some embodiments of the invention are shear-recovering fluids including a viscoelastic surfactant and rheology enhancer, wherein the shear recovery time of the fluid is 60 seconds or less, preferably about 40 seconds or less, more preferably about 20 seconds or less, and even more preferably about 15 seconds or less. In the fluid embodiments and method embodiments of the invention, the rheology enhancer may be one or more fiber materials, one or more particulate materials, or any combination of both.

The following examples are presented to illustrate the preparation and properties of energized aqueous fluids comprising heteropolysaccharides and a surfactant, and should not be construed to limit the scope of the invention, unless otherwise expressly indicated in the appended claims.

EXAMPLES

The invention can be further understood from the following example. In the example, the zwitterionic surfactants Zw A, Zw B, and Zw C are BET-E-40 containing about 1% polynaphthalene sulfonate. The concentrations given for the surfactants are for the as-received concentrates.

The table below shows the shear recovery times observed when various amounts of polylactide fiber rheology enhancers, available as NatureWorks 6201D, were added to three surfactant systems. In these experiments, approximately 200 mL of already-mixed VES fluid was sheared at no less than 10,000 rpm for no less than 30 seconds and no more than 1 minute in a 1 L Waring blender. The shearing was stopped and timing was begun. The fluid was poured back and forth between a beaker and the blender cup and the fluid recovery was characterized by two times, referred to as the initial and final recovery times; both were estimated by visual observation. The initial fluid recovery time was the time at which fluid "balling" occurred (when the fluid showed the first signs of elasticity as indicated by the fluid taking a longer time to achieve a flat surface in the receiving beaker when poured). The final fluid recovery time was the time at which fluid "lipping" occurred. The fluid "lips" when inclining the upper beaker or cup containing the fluid does not result in fluid flow into the container below, but rather the formation of a "lip", and pulling the container back to a vertical position pulls back the "lip". "Lipping" is used in these examples to estimate when the fluid reaches its near-equilibrium elasticity. The table shows the final fluid recovery times for several systems and shows that 0.25% by weight of polylactide fiber rheology enhancers, based upon total fluid weight, cuts the shear recovery times of three different zwitterionic surfactant systems into at least half of the value without the enhancer polylactide fibers.

| Surfactant System | Concentration | PLA Fiber Rheology Enhancer Amt (% of total fluid wt) | Shear Recovery Time (lipping time) |
|---|---|---|---|
| Zw C | 3.5 vol % | 0 | 120 sec |
|  |  | 0.24 wt % | 40 sec |
| Zw B | 5 vol % | 0 | 18 sec |
|  |  | 0.36 wt % | 9 sec |
| Zw A | 6 vol % | 0 | 12 sec |
|  |  | 0.36 wt % | 6 sec |

In addition to dramatically shortened shear recovery times at low concentrations, it is also possible that rheology enhancers of the invention may also increases proppant, i.e. sand, settling properties of treatment fluid systems. For example, polylactide fiber rheology enhancers may be added to fluids made with from about 1 to about 10% of as-received surfactant concentrate Zw A without any added salt. The sand settling properties of the fluid may be measured by simple benchtop experiments at suitable temperatures. For other surfactant/rheology enhancer combinations and other surfactant concentrations, the optimal rheology enhancer concentration may be different from the use if Zw A. Similarly, if optimization at a certain temperature is desired, another surfactant/rheology enhancer combination and/or other surfactant and rheology enhancer concentrations may be optimal.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A subterranean formation treatment method comprising:
   a. providing a fluid comprising a viscoelastic surfactant and a fiber material, the fiber material added in a concentration of from about 0.20 to about 0.25 wt % in the fluid sufficient to provide a shear recovery time of about 40 seconds or less; and
   b. injecting the fluid into wellbore to enable the fluid to contact the subterranean formation, wherein the fiber material decreases proppant settling.

2. The method of claim 1 wherein the method is a fracturing method comprising a first fluid injection stage and a second fluid injection stage, and wherein proppant is added to the fluid during the second fluid stage.

3. The method of claim 1 wherein the viscoelastic surfactant comprises a zwitterionic surfactant.

4. The method of claim 3 wherein the zwitterionic surfactant comprises a surfactant or mixture of surfactants having the formula:

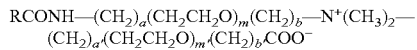

wherein R is an alkyl group that contains from about 17 to about 23 carbon atoms which may be branched or straight chained and which may be saturated or unsaturated; a, b, a', and b' are each from 0 to 10 and m and m' are each from 0 to 13, a and b are each 1 or 2 if m is not 0 and (a+b) is from 2 to 10 if m is 0; a' and b' are each 1 or 2 when m' is not 0 and (a'+b') is from 1 to 5 if m' is 0; (m+m') is from 0 to 14; and $CH_2CH_2O$ may also be $OCH_2CH_2$.

5. The method of claim 3 wherein the zwitterionic surfactant has the betaine structure:

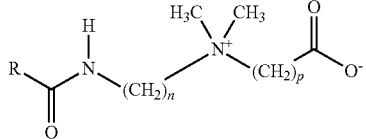

wherein R is a hydrocarbon group that may be branched or straight chained, aromatic, aliphatic or olefinic and has from about 14 to about 26 carbon atoms and may contain an amine; n=about 2 to about 4; and p=1 to about 5, and mixtures of these compounds.

6. The method of claim 5 wherein the betaine is selected from the group consisting of oleylamidopropyl betaine and erucylamidopropyl betaine.

7. The method of claim 5 wherein the fluid further comprises a co-surfactant.

8. The method of claim 1 wherein the viscoelastic surfactant comprises a cationic surfactant.

9. The method of claim 8 wherein the cationic surfactant comprises a surfactant or mixture of surfactants having the structure:

in which $R_1$ has from about 14 to about 26 carbon atoms and may be branched or straight chained, aromatic, saturated or unsaturated, and may comprise a carbonyl, an amide, a retroamide, an imide, a urea, or an amine; $R_2$, $R_3$, and $R_4$ are each independently hydrogen or a $C_1$ to about $C_6$ aliphatic group which may be the same or different, branched or straight chained, saturated or unsaturated and one or more than one of which may be substituted with a group that renders the $R_2$, $R_3$, and $R_4$ group more hydrophilic; the $R_2$, $R_3$, and $R_4$ groups may be incorporated into a heterocyclic 5- or 6-member ring structure which includes the nitrogen atom; the $R_2$, $R_3$, and $R_4$ groups may be the same or different; $R_1$, $R_2$, $R_3$, and/or $R_4$ may contain one or more ethylene oxide and/or propylene oxide units; and $X^{31}$ is an anion; and mixtures of these compounds.

10. The method of claim 9 wherein $R_1$ comprises from about 18 to about 22 carbon atoms and may comprise a carbonyl, an amide, or an amine; $R_2$, $R_3$, and $R_4$ comprise from 1 to about 3 carbon atoms, and $X^{31}$ is a halide.

11. The method of claim 10 wherein $R_1$ comprises from about 18 to about 22 carbon atoms and may comprise a carbonyl, an amide, or an amine, and $R_2$, $R_3$, and $R_4$ are the same as one another and comprise from 1 to about 3 carbon atoms.

12. The method of claim 1 wherein the fluid further comprises a member selected from the group consisting of amines, alcohols, glycols, organic salts, chelating agents, solvents, mutual solvents, organic acids, organic acid salts, inorganic salts, oligomers, and mixtures of the members.

13. The method of claim 1 wherein the viscoelastic surfactant is an amphoteric surfactant comprising an amine oxide.

14. The method of claim 13 wherein the amine oxide comprises an amidoamine oxide.

15. The method of claim 1 wherein the fiber material is present in the fluid at a concentration sufficient to provide a rheology enhancer surface area of from about 0.1 $m^2$ per liter of fluid or greater.

16. A method for fracturing subterranean formation, the method comprising:
   a. providing a first fluid comprising a viscoelastic surfactant and a first rheology enhancer, the rheology enhancer incorporated in a concentration sufficient to provide a shear recovery time of about 40 seconds or less;
   b. injecting the first fluid into wellbore at a pressure equal to or greater than fracture initiation pressure of the formation;
   c. providing a second fluid comprising a viscoelastic surfactant and a proppant; and,
   d. injecting the second fluid into wellbore a pressure equal to or greater than fracture initiation pressure of the formation,
   wherein the rheology enhancer is a fiber material and is present in the fluid at a concentration of from about 0.20 to about 0.25 wt %.

17. The method of claim 16 wherein the first fluid is injected during a first fluid injection stage, the second fluid is injected during a second fluid injection stage, and a third fluid comprising a second rheology enhancer is injected during the second fluid stage.

18. The method of claim 17 wherein during the second fluid stage, injection rate of the third fluid is decreased while the injection rate of the second fluid is increased.

19. A method of decreasing the shear recovery time of a viscoelastic surfactant based fluid comprising providing a fluid in a subterranean formation, the fluid comprising a viscoelastic surfactant selected from the group consisting of zwitterionic, amphoteric, anionic, and cationic surfactants and mixtures thereof, and adding a rheology enhancer in a concentration sufficient to provide a shear recovery time of about 40 seconds or less wherein the rheology enhancer is a fiber material and is present in the fluid at a concentration of from about 0.20 to about 0.25 wt %.

* * * * *